Oct. 29, 1957  J. T. McNANEY  2,811,665
ANALOG DATA CONVERTER
Filed Jan. 19, 1953  2 Sheets-Sheet 2
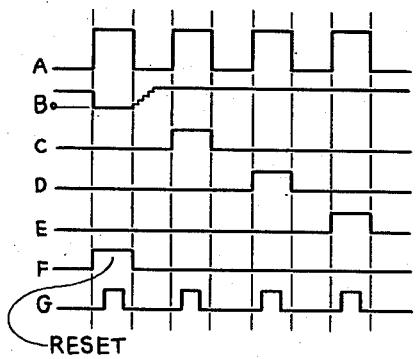
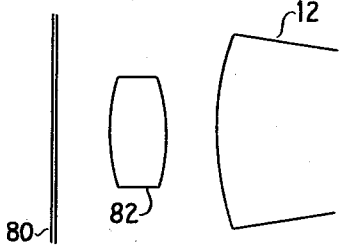
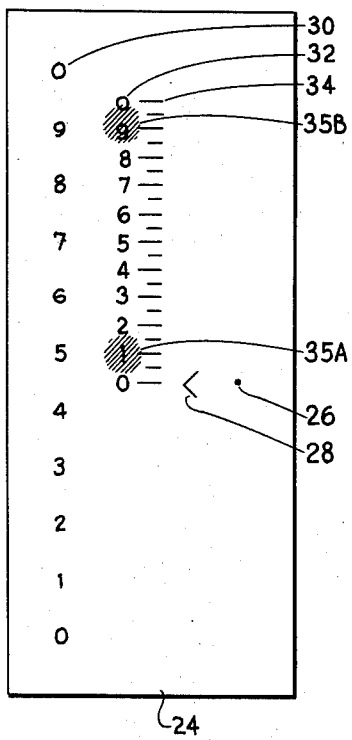
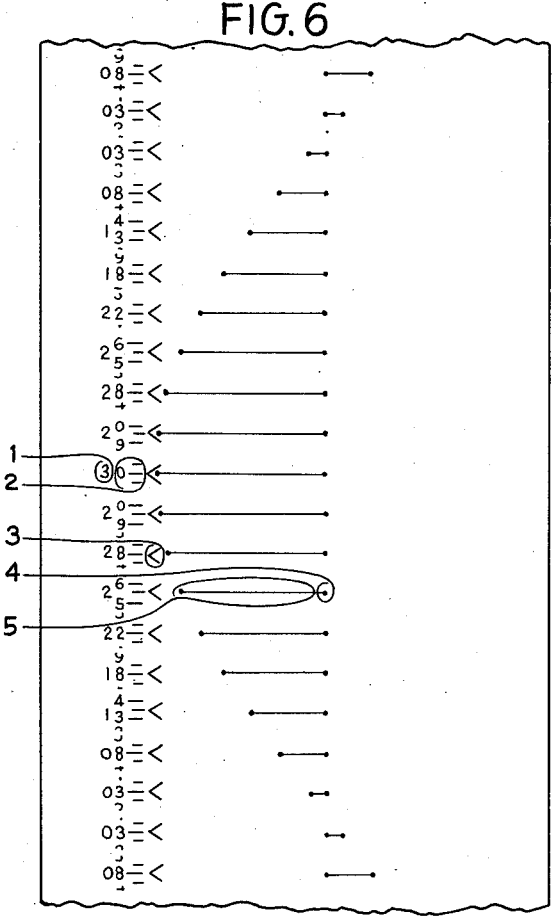
INVENTOR.
JOSEPH T. McNANEY
BY
ATTORNEY United States Patent Office 2,811,665
Patented Oct. 29, 1957

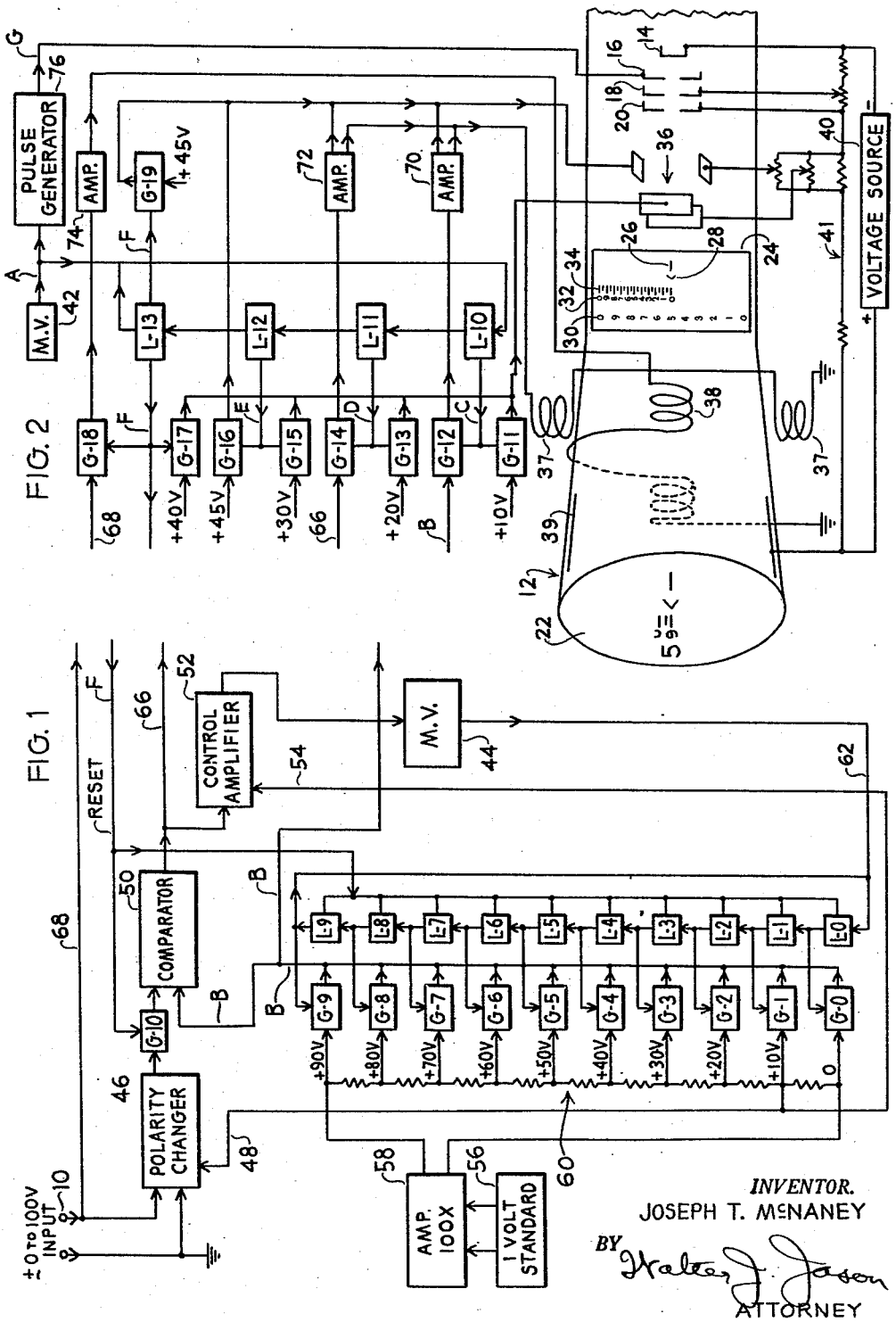

2,811,665

ANALOG DATA CONVERTER

Joseph T. McNaney, San Diego, Calif., assignor, by mesne assignments, to General Dynamics Corporation, a corporation of Delaware Application January 19, 1953, Serial No. 331,806

10 Claims. (Cl. 315—8.5)

This invention relates to improved analog converter systems, and it has particular reference to systems in which cathode-ray apparatus is employed both to effect analog conversion of an electric signal and to provide a display of the converted information.

My copending application Serial No. 298,603, filed on July 12, 1952, now U. S. Patent No. 2,735,956 discloses cathode-ray apparatus in which the beam of electrons in the tube is shaped so that its cross section is in the form of selected configurations, such as characters and numbers. A thin solid member is located along the path of the beam of electrons in the cathode-ray tube, and a plurality of apertures is provided in the solid member for controlling the cross-sectional shape of the electron beam, with the individual apertures shaped in the form of the configurations to be displayed. Suitable deflection systems are provided for directing the beam of electrons through selected individual apertures in the solid member and for directing the shaped beam toward any part of the screen.

I have discovered that cathode-ray apparatus of this general type may be employed to effect an analog conversion of an electric signal and to provide a display of the converted information. A permanent record of the displayed information may be provided by photographing the displays or by recording the displays directly on suitable sensitized paper.

In accordance with my invention, the magnitude of an input signal is sampled periodically and control signals representative of the instantaneous magnitude of the input signal are produced and applied to the cathode-ray tube for directing the beam of electrons of the tube through corresponding apertures. The cross-section of the beam of electrons and hence the information which is displayed on the screen of the tube is shaped according to the shape of the aperture through which the beam is directed. Ordinarily the apertures are shaped in the form of numerals and graduations or index marks, so as to provide a numerical analog conversion of the input signal.

Preferably the apparatus is arranged to display a series of lines adjacent the numerical displays, which lines represent the magnitude and polarity of the input signal at the instants at which the numerical analog conversion is effected. Thus, the outline of the lines corresponds to the waveform of the input signal.

The analog converter of my invention is arranged to provide a read-out to three places with an accuracy of ±0.1 volt. The operation of the converter is not affected by the source of impedance of the input signal, and the converter can be arranged to sample the input signal at high rates, say one thousand times per second or more.

The invention is explained with reference to the drawings in which:

Figs. 1 and 2 show a preferred embodiment of the analog converter system of my invention;

Fig. 3 shows the wave form and timing relationship of various signals which are produced in the apparatus of Figs. 1 and 2 during one cycle of operation;

Fig. 4 shows one suitable arrangement of the apertures in the solid member which is employed in the cathode-ray tube of Fig. 2 to shape the electron beam of the tube;

Fig. 5 illustrates one arrangement for providing a continuous record of the information displayed on the screen of the cathode-ray tube; and Fig. 6 discloses a typical record which may be obtained with the arrangement of Fig. 4.

The letters which designate the various waveforms shown in Fig. 3 are employed in Figs. 1 and 2 to designate the circuits at which these waveforms are produced.

The apparatus shown in Figs. 1 and 2 is arranged to effect an analog conversion of varying input signals having maximum amplitudes of 100 volts. However, it will be apparent that the invention is not limited to any particular voltage range.

An input circuit 10 is provided for receiving signals for analog conversion. The signal which is applied to the input circuit 10 is periodically sampled during brief intervals of time and signals representative of the instantaneous magnitude of the input signal are produced and applied to a cathode-ray tube 12 which serves to provide a display indicating the instantaneous numerical value of the input signal during each sampling period. Preferably, the cathode-ray tube 12 is also employed to provide a graphical display indicating the magnitude and polarity of the input signal.

The cathode-ray tube 12 is provided with a conventional electron gun located at one end of the tube and having a cathode 14, a control electrode 16, a focusing electrode 18, and an accelerating electrode 20. The beam of electrons is projected longitudinally along the tube toward a conventional screen 22 located at the opposite end of the tube.

A thin solid member 24 is located along the path of the electron beam between the electron gun and the screen of the tube. The solid member 24 is disposed perpendicularly with respect to the axis of the tube and hence substantially perpendicularly with respect to the path of the electron beam, and it may be composed of either a conductive or a non-conductive material. A solid member composed of copper is particularly suitable because of the ease with which the apertures may be formed by etching or engraving. The material should be thin, say of the order of .002 inch, so that it it will not cause undesirable distortion of the electron beam as it passes through the selected apertures.

As more clearly shown in Fig. 4, a plurality of apertures are provided in the solid member 24 for controlling the cross-sectional shape of the beam of electrons when the beam is directed through selected apertures. I prefer to provide the solid member 24 with a circular aperture 26, a marker aperture 28 for use with index marks, and with two columns 30 and 32 of apertures shaped in the form of numerals. The numerals in the column 30 represent the tens digit and the numerals in the column 32 represent the units digit of a number indicating the magnitude of the signal which is applied to the input circuit 10. A column 34 of apertures shaped in the form of index marks is located adjacent the column 32 of numerals representing the units digit. The index marks are employed to provide an indication of the tenths digit of the numerical magnitude of the input signal.

I prefer to arrange the numerals in the tens digit column 30 so that they extend the length of the solid member 24, and to arrange the numerals in the units digit column 32 and the index marks in the column 34 so that they extend approximately one-half the length of the solid member. With this arrangement the signals required for controlling the beam of electrons are simplified.

The size of the beam of electrons is adjusted so that it passes through only one numeral-shaped aperture when it is directed toward the tens digit column 30, and so that the beam passes through at least one numeral-shaped aperture and the index marks associated therewith when it is directed toward the units digit column 32. When the beam is centered on one numeral-shaped aperture in the units digit column 32 as illustrated at 35A in Fig. 4, the beam does not pass through the numeral-shaped apertures which are adjacent the aperture upon which the beam is centered. However, when the beam is not centered on one numeral-shaped aperture in the units column 32, it passes through part of one of the next adjacent apertures. This is illustrated at 35B in Fig. 4, where the beam is positioned to represent 9.2 volts.

An electrostatic deflection system 36 is provided for directing the electron beam toward selected apertures in the solid member 24. A vertical deflection system 37 and a horizontal deflection system 38 are provided between the solid member 24 and the screen of the tube for controlling the location on the screen at which the information is displayed. The magnetic fields produced by the deflection systems 37 and 38 should be arranged to act upon the beam of electrons at any of the various locations through which the beam may be projected along the tube after the beam traverses the solid member 24.

Preferably the cathode-ray tube is provided with a conventional intensifier electrode 39 for improving the definition of the displayed information.

A conventional voltage source 40 and a divider 41 serve to provide suitable focusing and accelerating potentials for the various electrodes of the cathode-ray tube.

The sequence of operations of the apparatus for providing the control potentials for the cathode-ray tube is controlled by a pair of multivibrators 42 and 44. The multivibrator 42 is free-running, and the multivibrator 44 is turned on and off during the sampling operation, as explained below. The multivibrator 44 should operate at a frequency which is at least 10 times that of the multivibrator 42, and preferably at a frequency which is about 25 times that of the multivibrator 42 so as to increase the accuracy of the sampling operation. By way of example, the multivibrator 42 may be operated at a frequency of 4 kilocycles per second and the multivibrator 44 at a frequency of 100 kilocycles per second.

The output signal A produced by the multivibrator 42 serves to control a commutating system for applying various control voltages to the cathode-ray tube 12, and it also serves to control the sequence of operations of the apparatus which performs the sampling operation and produces signals corresponding to the instantaneous magnitude of the signal applied to the input circuit.

The input circuit 10 is connected to a polarity changer 46 where the input signal is compared with a reference voltage which is applied to the polarity changer through a line 48. The polarity changer 46 provides a positive signal voltage output irrespective of the polarity of the input signal, and the magnitude of the output signal of the polarity changer is proportional to the magnitude of the signal applied to the input circuit 10.

The output of the polarity changer 46 is applied through a gate G10 to a comparator circuit 50. The gate G10 is normally open, and it is closed only when a reset pulse F is applied from the commutating system.

A series of standard reference voltages is applied in steps through the line B to the comparator 50, and the comparator provides an output signal which is proportional to the difference between the signal applied through the gate G10 and the signal applied over the line B. The output of the comparator 50 is applied to a control amplifier 52 which is arranged to produce a signal only if the signal received from the comparator 50 exceeds 10 volts. A standard reference voltage is applied to the control amplifier 52 over a line 54 so as to provide an accurate reference for controlling the amplifier.

The output of the control amplifier 52 is applied to the multivibrator 44 and it serves to turn the multivibrator on and off. The multivibrator 44 is normally cut off, and the control amplifier 52 serves to actuate the multivibrator 44 only when the signal applied to the control amplifier 52 from the comparator 50 exceeds 10 volts.

The standard reference voltages are produced by a one volt standard 56, an amplifier 58 which amplifies the output of the one volt standard 100 times, and a divider 60 which is provided with taps ranging from 0 to 90 volts in 10 volt steps.

The taps on the voltage divider 60 are connected through gates G0 to G9 to the line B which is connected to the comparator 50. The gates G0 to G9 are normally closed, and they are opened one at a time in sequence by signals from a linear counter chain L0 to L9. The counter chain L0 to L9 is controlled by signals applied from the multivibrator 44 through a line 62.

If, for example, the signal applied through the gate G10 to the comparator 50 is 59.2 volts, the comparator 50 will produce an output signal of 59.2 volts at the instant that the reset pulse F terminates so that the gate G10 opens. No voltage will be applied over the line B at this instant since the line B is connected to the 0 volt tap on the divider 60 through the gate G0. The control signal produced by the comparator 50 and the control amplifier 52 will actuate the multivibrator 44, and the pulses produced by this multivibrator will actuate the linear counter chain L0 to L9. The first pulse causes the counter L1 to open the gate G1, which in turn applies a potential of 10 volts to the line B. The second pulse registers in the counter L2 and causes the gate G2 to apply 20 volts to the line B. This registration of pulses in the linear counter chain will continue until the fifth pulse from the multivibrator 44 causes a potential of 50 volts to be applied to the line B, as shown in the curve B of Fig. 3.

When a 50 volt potential is applied over the line B to the comparator 50, the output of the comparator 50 drops to 9.2 volts and this is insufficient to cause the control amplifier 52 to actuate the multivibrator 44. Hence the multivibrator 44 ceases to produce an output signal when this condition results, and the linear counter chain L0 to L9 is maintained with the last count registered in the chain until the apparatus is reset by a pulse F which is applied to the linear counter chain and to the gate G10.

Thus, during the interval of time between each reset pulse F, the output of the comparator 50 is a voltage which is equal to the units and tenths digits, and the voltage applied to the line B is equal to the tens digit of a number representing the magnitude of the input signal at the instant at which the sampling operation occurs.

The signal B is applied to the input of a gate G12, and the output of the comparator 50 is applied through a line 66 to the input of a gate G14. These gates are part of a commutating system under the control of the multivibrator 42. The voltage which is applied through the gate G12 is employed in the selection of the tens digit and the voltage applied through the gate G14 is employed in the selection of the units digit to be displayed on the screen of the cathode-ray tube 12.

The input signal is applied through a line 68 to a gate G18, which is also part of the commutating system. The signal which is applied through the gate G18 is employed to cause the cathode-ray tube 12 to display a line representing the magnitude and the polarity of the input signal which is applied to the input circuit 10.

The commutating system comprises the linear counter chain L10 to L13 and the gates G11 to G19. The linear counter chain L10 to L13 is controlled by the signal A which is produced by the multivibrator 42, and the counter chain advances one count for each pulse produced by the multivibrator. The counters L10 to L13 produce the signals C, D, E and F shown in Fig. 3, which signals serve to open the normally closed gates G11 to G19. The signal F is also employed to close the normally open gate G10 and to reset the linear counter chain L0 to L9, as discussed above.

The inputs of the gates G11, G13, G15 and G17 are connected to potentials of 10, 20, 30 and 40 volts respectively. These potentials may be derived from the divider 60 or from any other suitable source.

The outputs of these gates are coupled to the horizontal plates of the deflection system 36, and the four gates serve to position the beam horizontally along the solid member 24 so that the beam is first directed toward the tens digit column 30, then toward the units digit column 32 and the column 34 of index marks, then toward the marker 28 and finally toward the circular aperture 26.

The outputs of gates G12 and G14 are applied through amplifiers 70 and 72 to the vertical plates of the deflection system 36.

When the counter L10 operates, the signal C causes the gates G11 and G12 to open. The 10-volt potential applied through the gate G11 causes the electron beam of the cathode-ray tube to be directed toward the tens digit column 30 of the solid member 24, and the signal which is applied through the gate G12 to the amplifier 70 causes the beam to be positioned vertically along the column 30 in accordance with the magnitude of the voltage applied through the gate G14, say to the numeral 5 in the example given.

When the counter L11 operates, the signal D causes the gates G13 and G14 to open. The 20-volt potential applied through the gate G13 causes the electron beam of the cathode-ray tube to be directed toward the units digit column 32 and the column 34 of index marks, and the signal which is applied through the gate G14 to the amplifier 72 causes the beam to be positioned vertically along the column 32 in accordance with the magnitude of the voltage applied through the gate G14, say slightly above the numeral 9 in the example given.

When the counter L12 operates, the signal E opens gates G15 and G16. The 30 volt potential applied through the gate G15 to the horizontal plates of the deflection system 36 causes the electron beam to be positioned at the horizontal location of the marker 28, and a 45 volt potential which is applied through the gate G16 to the vertical plates of the deflection system 36 causes the electron beam to be located at the vertical location of the marker 28.

When the counter L13 operates, the signal F causes gates G17, G18 and G19 to open. The 40 volt potential applied through the gate G17 to the horizontal plates of the deflection system 36 causes the beam to be moved to the horizontal location of the circular aperture 26, and a 45 volt potential which is applied through the gate G19 to the vertical plates of the deflection system 36 causes the electron beam to be located at the vertical location of the circular aperture 26.

While the gates G17 and G19 are open, the input signal is applied through the gate G18 and an amplifier 74 to the horizontal deflection coils 38. This causes the beam of electrons of the cathode-ray tube to trace a line on the screen of the cathode-ray tube having a magnitude and a direction which corresponds to the magnitude and polarity of the input signal.

The vertical location of the images produced by the beam of electrons when it passes through the apertures 26 and 28 is fixed since it is controlled by the location of these apertures in the solid member. However, the vertical position of the electron beam after it passes through the apertures in the columns 30, 32 and 34 changes with the magnitude of the input signal. Signals are applied from the amplifiers 70 and 72 to the vertical deflection coils 37 which cause the vertical position of the numerals and index marks to correspond to the vertical position of the index marker and the line on the screen of the tube. The signal applied from the amplifier 70 to the coils 37 serves to cause the tens digit to be aligned with the index marker on the screen, and the signal applied from the amplifier 72 to the coils 37 serves to cause the units digit and the index marks to be positioned in accordance with the magnitude of the tenths digit. In the example given, the units digit 9 and the index marks would be positioned so that the index mark adjacent the numeral 9 is spaced .2 below the index marker, as illustrated in Fig. 2.

The control grid 16 of the cathode-ray tube is normally biased to cut-off, and it is unblocked each time that one of the counters L10 to L13 operates. This is achieved by pulses G which are provided by a pulse generator 76 in response to the pulses A from the multivibrator 42.

Thus, the signal which is applied to the input circuit 10 is sampled at a rate which is one-fourth the frequency of the multivibrator 42, and numerical representations of the magnitude along with graphical representations of the magnitude and polarity of the input signal are provided on the screen of the cathode-ray tube. In the arrangement shown in the drawings, the tens digit is displayed first, then the units digit and the index marks, then the index marker, and finally a line representing the magnitude and polarity of the signal. It will be apparent that other sequences of operation may be employed.

The information which is displayed on the screen of the cathode-ray tube may be recorded in various manners. Fig. 5 illustrates one arrangement wherein a strip of light sensitive paper 80 is moved past the screen of the cathode-ray tube 12 at a substantially constant rate. The images which are displayed on the screen of the tube are focused by a collimating lens 82 so as to provide satisfactory definition of the images at the recording paper.

Fig. 6 illustrates a typical record which may be obtained with the arrangement shown in Fig. 5. The record shown in Fig. 6 illustrates the type of record obtained when a sine wave signal is applied to the input circuit 10 of the analog converter. The numerical magnitude and the polarity of the signal are indicated at the various instances at which the input signal is sampled, and the numerical magnitude of the signal can be read to three places with accuracy. The tens and units digits representing the magnitude are indicated numerically, and the tenths digit is read by means of the index marks and the index marker. If desired, the numerical display may be arranged to represent three places other than the tens, units and tenths digits of the magnitude of the input signal. For example, the apparatus may be arranged to read-out to hundreds, tens and units digits.

It will be apparent that various arrangements may be employed for providing suitable potentials for controlling the deflection of the beam of the cathode-ray tube; however Figs. 1 and 2 show my preferred arrangement. Also, it will be apparent that an electromagnetic deflection system may be employed instead of the electrostatic system 36, and that electrostatic deflection systems may be employed instead of the electromagnetic systems 37 and 38 shown in Fig. 2.

I claim:

1. An analog conversion system comprising a cathode-ray tube having a screen at one end and an electron gun at the other end for projecting a beam of electrons toward the screen, a solid member having a plurality of apertures therein shaped in the form of numbers located between the electron gun and the screen and disposed approximately perpendicularly with respect to the path of the beam of electrons, a first deflection means located between the electron gun and the solid member for directing the beam of electrons toward selected apertures in the solid member, a source of predetermined reference voltages, means responsive to an input signal and said reference voltages and coupled to the first deflection means for providing signals for causing the beam of electrons to pass through the respective apertures which correspond to the instantaneous magnitude of the input signal, and a second deflection means for directing the beam of electrons toward a predetermined area on the screen of the tube.

2. An analog conversion system comprising a cathode-ray tube having a screen at one end and an electron gun at the other end for projecting a beam of electrons toward the screen, a solid member having a plurality of apertures therein shaped in the form of numbers located between the electron gun and the screen, a first deflection means located between the electron gun and the solid member for directing the beam of electrons toward selected apertures in the solid member, a source of predetermined reference voltages, means responsive to an input signal and said reference voltages for providing control signals which correspond to the instantaneous magnitude of the input signal, a commutator coupled between said means for providing control signals and the first deflection means for repeatedly applying the control signals to the first deflection means and causing the beam of electrons to pass through the respective apertures which correspond to the instantaneous magnitude of the input signal, and a second deflection means for directing the beam of electrons toward the screen of the tube.

3. An analog conversion system comprising a cathode-ray tube having a screen at one end and an electron gun at the other end for projecting a beam of electrons toward the screen, a solid member having a plurality of apertures therein located between the electron gun and the screen, one of the apertures being circular and a plurality of the apertures being shaped in the form of numerals, a first deflection means located between the electron gun and the solid member for directing the beam of electrons toward selected apertures in the solid member, means responsive to an input signal and coupled to the first deflection means for providing signals for causing the beam of electrons to pass repeatedly through the respective numeral-shaped apertures which correspond to the instantaneous magnitude of the input signal and through the circular aperture, said means including a circuit for receiving the input signal, a source of reference voltages, conversion circuits responsive to said input signal and said reference voltages for providing potentials representing the numerical value of the signal magnitude, and commutator means for causing the electron beam to pass through successive apertures, a second deflection means for directing the beam of electrons toward a predetermined area on the screen of the tube after it passes through the numeral-shaped apertures, and a third deflection means located between the solid member and the screen and responsive to said input signal for deflecting the beam of electrons an amount and a direction representative of the magnitude and polarity of the input signal after the beam passes through the circular aperture.

4. An analog conversion system comprising a cathode-ray tube having a screen at one end and an electron gun at the other end for projecting a beam of electrons toward the screen, a solid member having a plurality of apertures therein shaped in the form of numerals located between the electron gun and the screen, the numeral-shaped apertures being located in two columns with the numerals in each column being in numerical order, a first deflection means located between the electron gun and the solid member for directing the beam of electrons toward selected apertures in the solid member, means responsive to an input signal and coupled to the first deflection means for providing a pair of potentials corresponding to two places of the instantaneous numerical value of the input signal and causing the beam of electrons to pass successively through the corresponding pairs of numeral-shaped apertures, said means including a circuit for receiving the input signal, a source of reference voltages, conversion circuits responsive to said input signal and said reference voltages for providing potentials representing the numerical value of the signal magnitude, and commutator means for causing the electron beam to pass through successive apertures, and a third deflection means located between the solid member and the screen for directing the beam of electrons toward predetermined locations on the screen.

5. An analog conversion system comprising a cathode-ray tube having a screen at one end and an electron gun at the other end for projecting a beam of electrons toward the screen, a solid member having a plurality of apertures therein located between the electron gun and the screen, one of the apertures being circular and a plurality of the apertures being shaped in the form of numerals, the numeral-shaped apertures being located in two columns with the numerals in each column arranged in numerical order, a first deflection means located between the electron gun and the solid member for directing the beam of electrons toward selected apertures in the solid member, means responsive to an input signal and coupled to the first deflection means for providing a pair of potentials corresponding to two places of the instantaneous numerical value of the input signal and causing the beam of electrons to pass repeatedly and successively through the corresponding pairs of numeral-shaped apertures, said means including a circuit for receiving the input signal, a source of reference voltages, conversion circuits responsive to said input signal and said reference voltages for providing potentials representing the numerical value of the signal magnitude, and commutator means for causing the electron beam to pass through successive apertures, means for directing the beam of electrons through the circular aperture after it has been directed through a pair of numeral-shaped apertures, a second deflection means located between the solid member and the screen and responsive to said input signal for deflecting the beam of electrons an amount and a direction representative of the magnitude and polarity of the input signal after it passes through the circular aperture.

6. An analog conversion system comprising a cathode-ray tube having a screen at one end and an electron gun at the other end for projecting a beam of electrons toward the screen, a solid member having a plurality of apertures therein located between the electron gun and the screen and disposed approximately perpendicularly with respect to the path of the beam of electrons, the apertures being shaped in the form of numerals and the numerals being located in two columns with the numerals in each column being arranged in numerical sequence, a first deflection means located intermediate the electron gun and the solid member for directing the beam of electrons toward selected apertures in the solid member, means responsive to an input signal and coupled to the first deflection means for providing signals for causing the beam of electrons to pass through the respective pairs of apertures in the two columns which correspond to the magnitude of the input signal, said means including a circuit for receiving the input signal, a source of reference voltages, conversion circuits responsive to said input signal and said reference voltages for providing potentials representing the numerical value of the signal magnitude, and commutator means for causing the electron beam to pass through successive apertures, and a second deflection means for directing the beam of electrons toward predetermined locations on the screen of the tube.

7. An analog conversion system comprising a cathode-ray tube having a screen at one end and an electron gun at the other end for projecting a beam of electrons toward the screen, a solid member having a plurality of apertures therein located between the electron gun and the screen, the apertures being shaped in the form of numerals and index marks, the numerals being located in two columns with the numerals in each column being arranged in numerical sequence, the index marks being located in a column adjacent one of the columns of numerals, a first deflection means located intermediate the electron gun and the solid member for directing the beam of electrons toward selected apertures in the solid member, means responsive to an input signal and coupled to the first deflection means for providing signals for repeatedly causing the beam of electrons to pass successively through the respective pairs of apertures in the two columns which correspond to the instantaneous magnitude of the input signal, the cross-section of the beam being sufficiently large to pass through part of the apertures shaped in the form of index marks when the beam is directed through the apertures shaped in the form of numerals which are in the column adjacent the index marks, said means including a circuit for receiving the input signal, a source of reference voltages, conversion circuits responsive to said input signal and said reference voltages for providing potentials representing the numerical value of the signal magnitude, and commutator means for causing the electron beam to pass through successive apertures, and a second deflection means for directing the beam of electrons toward predetermined locations on the screen of the tube.

8. An analog conversion system comprising a cathode-ray tube having a screen at one end and an electron gun at the other end for projecting a beam of electrons toward the screen, a solid member having a plurality of apertures therein shaped in the form of numbers and index marks located between the electron gun and the screen, the numbers being arranged in numerical sequence in a column with the index marks located in an adjacent column, the cross-section of the beam being sufficiently large to pass through at least one of the apertures shaped in the form of numbers and through the apertures shaped in the form of index marks which are adjacent thereto, a first deflection means located between the electron gun and the solid member for directing the beam of electrons toward selected apertures in the solid member, a second deflection means located between the solid member and the screen of the tube for directing the beam of electrons toward predetermined locations on the screen, and means responsive to an input signal and coupled to the first and second deflection means for providing signals to the first deflection means for causing the beam of electrons to pass through the respective apertures which correspond to the instantaneous magnitude of the input signal and for providing signals to the second deflection means for causing the numbers and index marks which are displayed on the screen of the tube to be positioned in accordance with the instantaneous magnitude of the input signal, so that the numerical display and the position of the index marks represent the magnitude of the input signal to the first and second places respectively, said means including a circuit for receiving the input signal, a source of reference voltages, conversion circuits responsive to said input signal and said reference voltages for providing potentials representing the numerical value of the signal magnitude, and commutator means for causing the electron beam to pass through successive apertures, and to be displayed on the screen of the tube in predetermined positions.

9. An analog conversion system comprising a cathode-ray tube having a screen at one end and an electron gun at the other end for projecting a beam of electrons toward the screen, a solid member having a plurality of apertures therein located between the electron gun and the screen, one of the apertures being approximately centrally located in the solid member and shaped in the form of a marker for use with index marks, a plurality of the apertures being shaped in the form of numerals and index marks with the numeral-shaped apertures located in two columns with one column representing the tens digit and the other column representing the units digit of a number, the index marks being located adjacent the column of numerals representing the units digit, a first deflection means located between the electron gun and the solid member for directing the beam of electrons toward selected apertures in the solid member, means responsive to an input signal and coupled to the first deflection means for providing signals for successively causing the beam of electrons to pass repeatedly through the respective pairs of numeral-shaped apertures in the two columns which correspond to the instantaneous magnitude of the input signal at predetermined intervals of time and also through the marker-shaped aperture, the beam of electrons being of sufficient cross-sectional size to pass through part of the apertures which are shaped in the form of index marks when the beam is directed through the apertures representing the units digit, said means including a circuit for receiving the input signal, a source of reference voltages, conversion circuits responsive to said input signal and said reference voltages for providing potentials representing the numerical value of the signal magnitude, and commutator means for causing the electron beam to pass through successive apertures, a second deflection means located between the solid member and the screen, and means coupled to the second deflection means for providing signals for causing the beam of electrons to be directed toward predetermined locations on the screen of the tube after it passes through the apertures representing numerals and index marks.

10. An analog conversion system comprising a cathode-ray tube having a screen at one end and an electron gun at the other end for projecting a beam of electrons toward the screen, a solid member having a plurality of apertures therein located between the electron gun and the screen, two of the apertures being approximately centrally located in the solid member with one of the apertures being circular and the other in the form of a marker for use with index marks, a plurality of the apertures being shaped in the form of numerals and index marks with the numeral-shaped apertures located in two columns with one column representing the tens digit and the other column representing the units digit of a number, the index marks being located adjacent the column of numerals representing the units digit, a first deflection means located between the electron gun and the solid member for directing the beam of electrons toward selected apertures in the solid member, means responsive to an input signal and coupled to the first deflection means for providing signals for successively causing the beam of electrons to pass repeatedly through the respective pairs of numeral-shaped apertures in the two columns which correspond to the instantaneous magnitude of the input signal at predetermined intervals of time and also through the circular and the marker-shaped apertures, the beam of electrons being of sufficient cross-sectional size to pass through part of the apertures which are shaped in the form of index marks when the beam is directed through the apertures representing the units digit, said means including a circuit for receiving the input signal, a source of reference voltages, conversion circuits responsive to said input signal and said reference voltages for providing potentials representing the numerical value of the signal magnitude, and commutator means for causing the electron beam to pass through successive apertures, a second deflection means for directing the beam of electrons toward predetermined locations on the screen of the tube when the beam of electrons is directed through the apertures representing numerals and index marks, and a third deflection means located between the solid member and the screen of the tube and responsive to said input signal for deflecting the beam of electrons after it passes through the circular aperture an amount proportional to the magnitude and a direction representative of the polarity of the input signal.

(References on following page)

References Cited in the file of this patent

UNITED STATES PATENTS

| | | |
|---|---|---|
| 1,634,390 | Zworykin | July 5, 1927 |
| 2,137,888 | Fuller | Nov. 22, 1938 |
| 2,186,268 | Pakala | Jan. 9, 1940 |
| 2,283,383 | McNaney | May 19, 1942 |
| 2,314,920 | Bumstead | Mar. 30, 1943 |
| 2,320,337 | Bryce | June 1, 1943 |
| 2,369,662 | Deloraine | Feb. 20, 1945 |
| 2,379,880 | Burgess | July 10, 1945 |
| 2,402,989 | Dickinson | July 2, 1946 |
| 2,556,640 | Baker | June 12, 1951 |
| 2,594,731 | Connolly | Apr. 29, 1952 |